United States Patent [19]

Teremy et al.

[11] Patent Number: 5,799,216
[45] Date of Patent: Aug. 25, 1998

[54] SCENE INTENSITY MEASURING AND ILLUMINATION SOURCE DETECTION APPARATUS

[75] Inventors: Paul Teremy, Rochester; Mark M. Meyers, Hamlin, both of N.Y.

[73] Assignee: Eastman Kodak Company, Rochester, N.Y.

[21] Appl. No.: 844,483

[22] Filed: Apr. 18, 1997

[51] Int. Cl.[6] .............................. G03B 7/08; G01J 1/42; G01J 3/40
[52] U.S. Cl. .......................... 396/225; 356/222; 356/404
[58] Field of Search .......................... 396/225; 356/404, 356/425, 402, 406, 222; 364/526; 348/223, 227

[56] References Cited

U.S. PATENT DOCUMENTS 5,617,175  4/1997  Asakura et al. .................. 396/225 X
5,710,948  1/1998  Takagi ............................. 396/225 X

*Primary Examiner*—W. B. Perkey
*Attorney, Agent, or Firm*—Pamela R. Crocker

[57] ABSTRACT

Scene intensity measuring and illumination source detection apparatus for determining scene illuminant and appropriate exposure settings for an image capture device is disclosed. The apparatus includes a diffractive optical element including an off-axis segment for dispersing incident scene illumination into its spectral components and for focusing the incident scene illumination, a structure responsive to the spectral intensities of the spectral components of the incident scene illumination for producing detection signals corresponding to such spectral components, a structure coupled to the sensing means for producing digitized detection signals, and a structure responsive to the digitized detection signals for determining the scene illuminant and the appropriate exposure settings for the image capture device.

22 Claims, 4 Drawing Sheets

SCENE INTENSITY MEASURING AND ILLUMINATION SOURCE DETECTION APPARATUS

FIELD OF THE INVENTION

The present invention relates to scene intensity measuring and illumination source detection apparatus for determining scene illuminant and appropriate exposure settings for an image capture device.

BACKGROUND OF THE INVENTION

To ensure that a photographic film is properly exposed when a picture is taken, the aperture opening and the shutter speed setting of an image capture device, such as a point and shoot camera, is determined before the picture is taken. Usually, the average ambient light level of the photographic scene is measured, and the shutter speed, aperture opening and flash requirement are calculated from the measured value. The camera takes the picture with the predetermined shutter and aperture settings. If flash illumination is required, the camera will enable the flash circuit so the flash will function as needed.

When photographing a scene, the type of illumination incident on the scene will affect the color balance observed on the resulting photographic print. For instance, fluorescent illumination will produce a green or blue-green tint on the print. The color balance on the print can be altered during photographic printing by changing the relative exposure of the red, green, and blue sensitive layers on the photographic paper. By reducing the green and blue layer exposures by a predetermined amount during the photographic printing, the color shifting effect of the fluorescent illumination can be neutralized.

SUMMARY OF THE INVENTION

Accordingly, it is an object of the present invention to determine the appropriate exposure time for a given photographic scene.

It is another object of the present invention to determine whether the illuminant on a photographic scene is a fluorescent lamp, tungsten, or daylight.

It is yet another object of the present invention to determine a ratio of blue and green exposure levels for appropriate photographic print exposure.

These objects are achieved by scene intensity measuring and illumination source detection apparatus for determining scene illuminant and appropriate exposure settings for an image capture device, comprising:

(a) a diffractive optical element including an off-axis segment for dispersing incident scene illumination into its spectral components and for focusing the incident scene illumination;

(b) sensing means responsive to the spectral components of the incident scene illumination for producing detection signals corresponding to the spectral intensities of such spectral components;

(c) means coupled to the sensing means for producing digitized detection signals; and (d) means responsive to the digitized detection signals for determining the scene illuminant and the appropriate exposure settings for the image capture device.

Advantages

An advantage of the present invention is to provide scene intensity measuring and illumination source detection apparatus in which light metering and illumination source detection are accomplished by the same hardware.

Another advantage of the present invention is to provide scene intensity measuring and illumination source detection apparatus which utilize a single optical element for dispersing and focusing of the incident light onto the exposure metering detector array, thereby reducing the size of the apparatus as well as manufacturing cost.

Yet another advantage of the present invention is to provide frame by frame determination of the scene illuminant and exposure level which enables the photofinisher to read information stored on each photographic film frame or with each digital image to properly compensate for the presence of fluorescent light, tungsten, or daylight during printing.

DETAILED DESCRIPTION OF THE INVENTION

Figure 1:
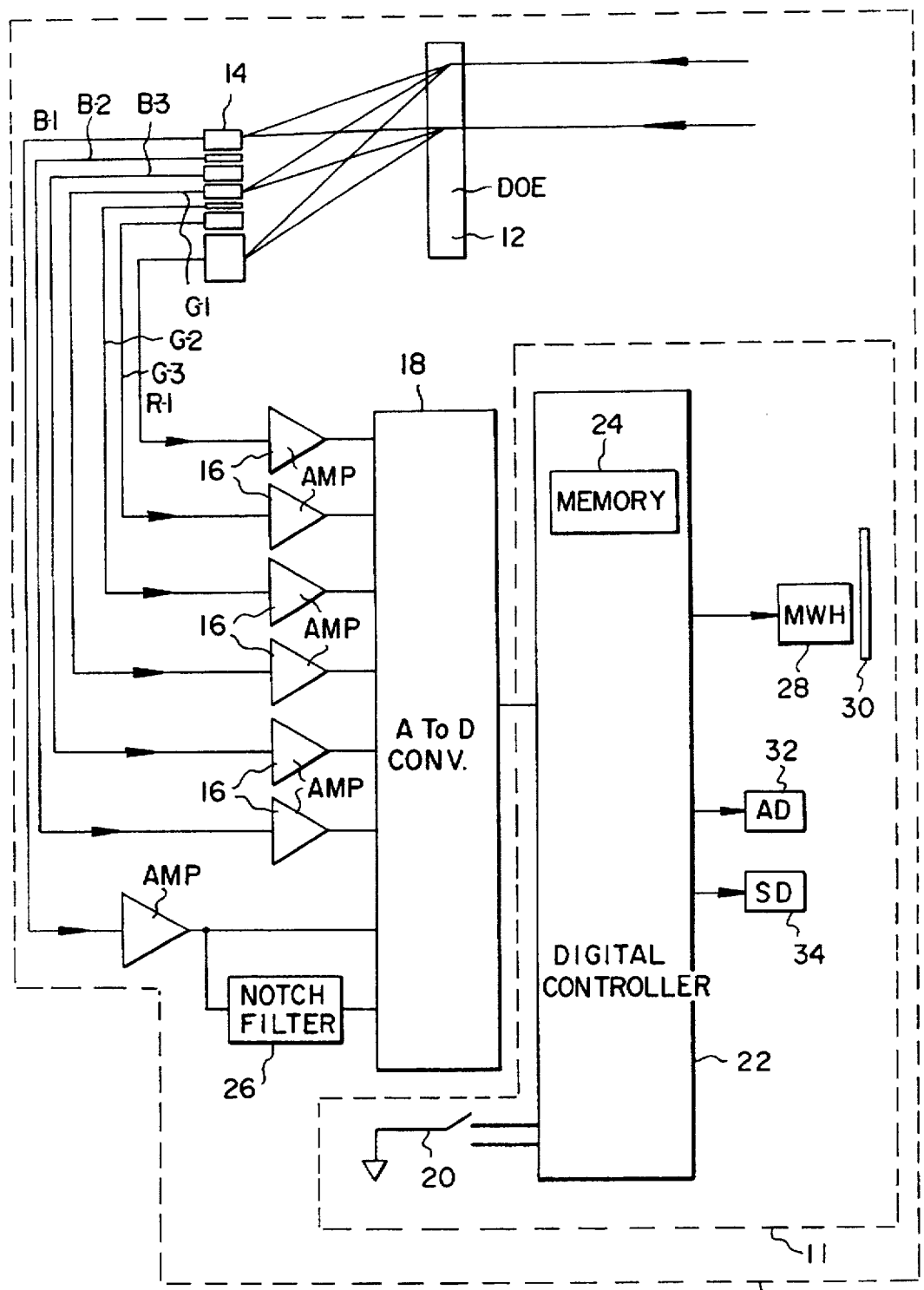
FIG. 1 is a block diagram of a scene intensity measuring and illumination source detection apparatus in accordance with the present invention.

FIG. 1 shows a block diagram of a scene intensity measuring and illumination source detection apparatus 10 in accordance with the present invention. The apparatus 10 provides illumination source determination as well as light metering to determine appropriate exposure settings for an image capture device 11 having a variable aperture (not shown) and a shutter (not shown) moveable between open and closed positions. In accordance with the present invention, light from a photographic scene is incident on an off-axis segment of a diffractive optical element (DOE) 12. The DOE 12 disperses the incident light into its spectral components, as well as focuses the incident light onto an array of photodetectors 14. The DOE 12 is formed with focusing power and spectral dispersion by using a decentered, or off-axis, segment of a larger DOE. Thus, the use of the off-axis DOE 12 provides the same function as a multi-element system, such as a combination of a diffraction grating and a focusing lens, or a combination of a prism and a focusing lens.

Figure 2A:
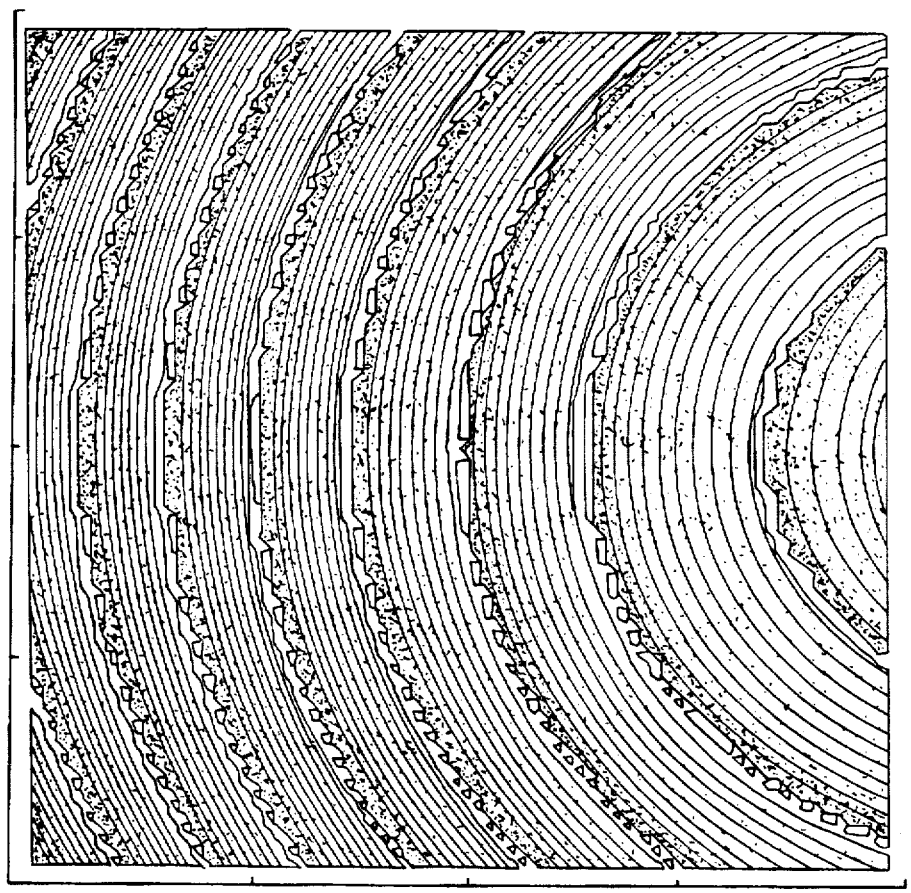
FIG. 2A is a top view of a portion of the diffractive optical element of FIG. 1.
Figure 2B:
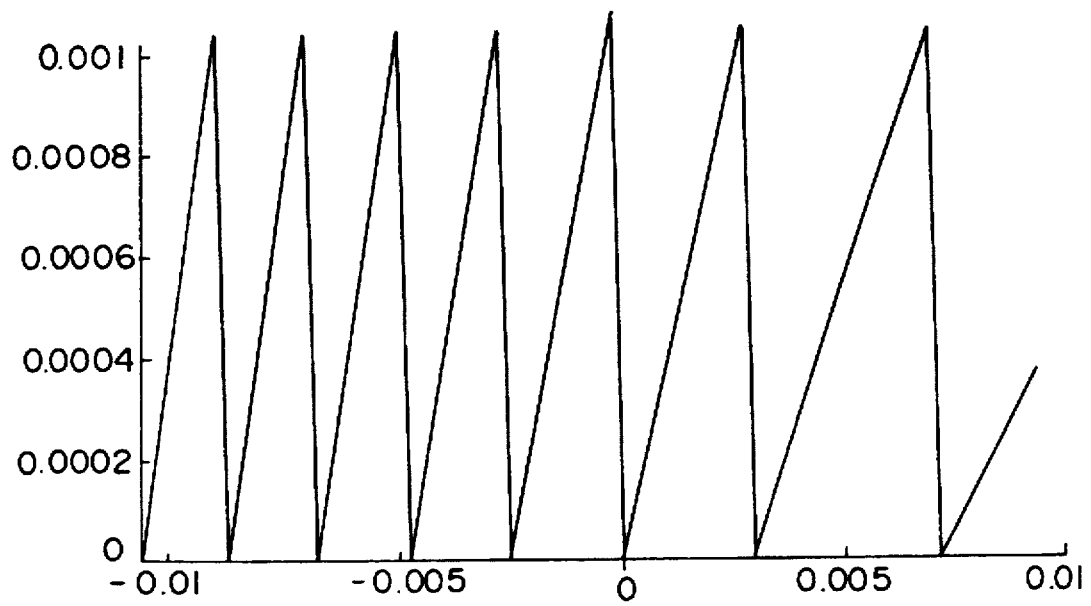
FIG. 2B is a side view of the surface relief profile of the diffractive optical element of FIG. 1.

Referring now to FIG. 2A, a top view of the off-axis segment of the DOE 12 of FIG. 1 is shown in more detail. The lines as shown in FIG. 2A represent contours of equal surface heights on the diffractive profile of the DOE 12. FIG. 2B shows a side view of the surface height profile along the line A—A through the center of the DOE 12. Maximum diffraction efficiency is achieved by using blazed surface relief profiles, as shown in FIG. 2B. Maximum theoretical diffraction efficiency at the center design wavelength is up to 100 percent. A more detailed discussion of DOE's is presented in commonly-assigned U.S. Pat. No. 5,581,405, issued on Dec. 3, 1996, entitled "Hybrid Refractive/Diffractive Achromatic Camera Lens and Camera Using Such."

Once the light is incident on the DOE 12, the resulting detector plane spectral intensity distribution results is a line of dispersed light with short wavelengths closer to the optical axis and longer wavelengths further away. In a direction perpendicular to the high spatial frequency component of the DOE 12, the light is dispersed with red light deflected by the largest amount and blue light deflected by the least amount. In a direction parallel to the high spatial frequency component of the DOE 12, the light is concentrated into a focused line. By placing the array of photodetectors 14 at the image plane of the DOE 12, the relative spectral intensity of different wavelength regions of the scene illumination source can be determined by converting the incident illumination from each part of the dispersed spectrum into a voltage proportional to its intensity.

Figure 3A:
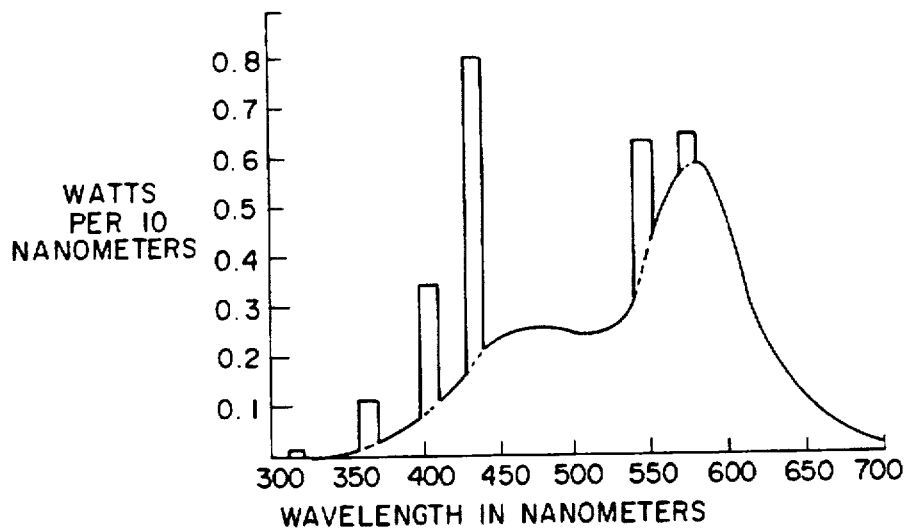
FIGS. 3A–3C are spectral intensity graphs showing intensity versus wavelength for fluorescent light, tungsten light, and daylight, respectively.
Figure 3A:
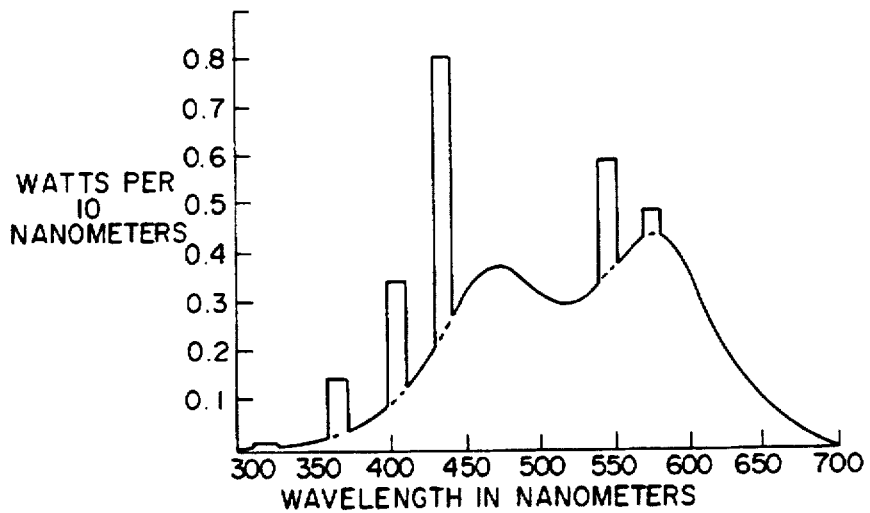
Figure 3A:
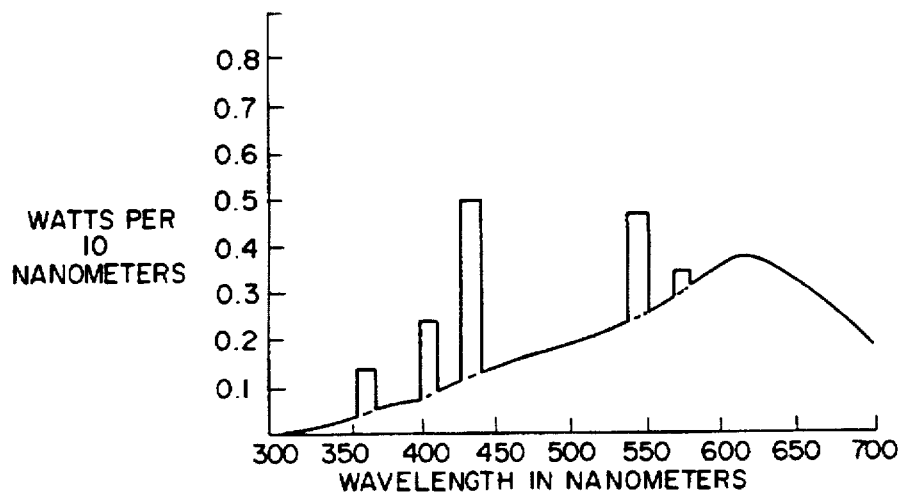
Figure 3C:
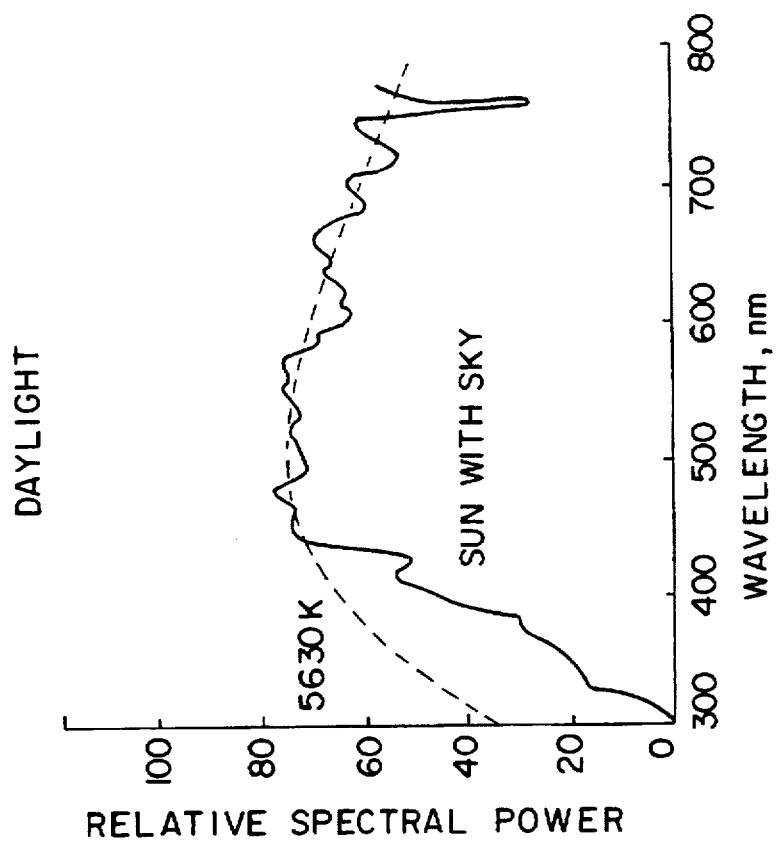
Figure 3B:
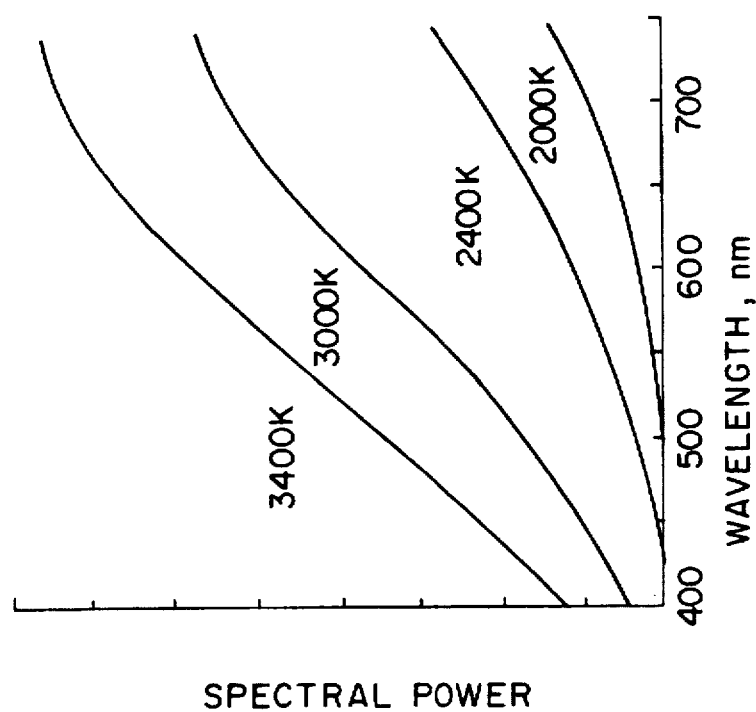

Referring now to FIGS. 3A–3C, spectral intensity graphs are shown for fluorescent light, tungsten, and daylight, respectively. One of the characteristics of fluorescent illumination is the presence of strong emission lines from the ionized mercury gas discharge line, which is partially absorbed by a phosphor coating on the fluorescent tube and partially transmitted. FIG. 3A shows a number of spectral intensity profiles for various fluorescent lamps. As shown in the profiles of FIG. 3A, the presence of the mercury gas discharge emission lines can be detected by looking at a narrow spectrum around 404.7 nm, 435.8 nm, 546.1 nm, or 578.0 nm. The relative spectral intensity of the 435.8 nm and the 546.1 nm spectrums are higher than those of 404.7 nm or 578 nm. If the relative spectral intensity of the mercury gas discharge emission lines when compared to the spectral intensities of other regions of the emission spectrum, such as 400–430 nm or 500–540 nm, is very high (for example, 3:1 or 5:1), it indicates that the illumination of the photographic scene is from a fluorescent light source.

FIG. 3B shows the output spectral intensity distribution for various tungsten filaments operating at different color temperatures. As the color temperature increases, the peak emission wavelength moves to shorter wavelengths and more blue light is present in the output spectrum. A typical tungsten lamp would operate at a color temperature of approximately 2600 to 3500 degrees Kelvin. As shown in FIG. 3B, if the relative illumination from the red region is much higher than that from the blue region, and the relative spectral intensity of the gas discharge lines when compared to the relative spectral intensities of broad spectral areas are not a large ratio, then it can be concluded that the scene illumination is from a tungsten source.

FIG. 3C shows the transmitted output spectrum from the sun, which corresponds to a color temperature of approximately 5630 degrees Kelvin. As shown in FIG. 3C, if the relative spectral intensities of the red, green, and blue spectral regions are approximately equal, and there are no gaseous discharge lines present, then it indicates that the illumination source is daylight.

Referring again to FIG. 1, the scene intensity measuring and illumination source detection apparatus 10 in accordance with the present invention will now be described. The incident light from the photographic scene is dispersed and focused by the DOE 12 onto the array of photodetectors 14. In order to determine scene illuminant information (i.e., whether the photographic scene is illuminated by fluorescent light, tungsten, or daylight), the array of photodetectors 14 includes seven photodetectors. Three of the photodetectors 14 detect the blue spectral region and are identified as B-1, B-2, and B-3. The B-2 photodetector is positioned to receive the 435.8 nm spectral line of the ionized mercury gas discharge that is present in the fluorescent output spectrum. The B-1 and B-3 photodetectors are positioned so that B-1 receives the 400–430 nm spectral component and B-3 receives the 440–500 nm spectral component. Similarly, the green spectral region is dispersed onto three photodetectors 14, which are identified as G-1, G-2, and G-3. The G-2 photodetector is positioned to receive the 546.1 nm mercury discharge line present in the fluorescent output spectrum. The G-1 and G-3 photodetectors are positioned so that G-1 receives the 500–540 nm spectral component, and G-3 receives the 550–600 nm spectral component. The remaining photodetector 14, identified as R-1, detects the red spectral region from 600–700 nm.

Each photodetector 14 detects the specific spectral component of the incident light, and produces a photocurrent corresponding to the spectral intensity (measured in Watts/$cm^2$*nm) of the spectral range. For example, photodetector B-1 produces a photocurrent corresponding to the spectral intensity in the spectral range of 400–430 nm. Thus, photocurrents are produced in the corresponding spectral ranges of 400–430 nm, 435.8 nm, 440–500 nm, 500–540 nm, 546.1 nm, 550–600 nm, and 600–700 nm. The detected photocurrents are input into transimpedance amplifiers 16, which convert the currents to voltage detection signals which are proportional to the intensity of the incident light's spectral components. The corresponding detection signals are then digitized by an A to D converter 18. In operation, when a trigger switch 20 of the image capture device 11, such as a two-level switch used in a point and shoot camera, is depressed half-way, a digital controller 22 in the image capture device 11 signals the A to D converter 18 to convert the analog voltage detection signals to digital numbers. The digital numbers, which are proportional to the spectral components of the incident light intensity, are read by the digital controller 22 and stored into a controller memory 24. The digital numbers are then used to evaluate the relative intensity of the spectral components in order to determine the scene illuminant information.

To determine whether the scene illumination source is fluorescent light, tungsten, or daylight, the digital controller 22 calculates the ratio of the measured spectral intensities of B-2 to B-1, B-2 to B-3, G-2 to G-1, G-2 to G-3 and the sum of B-1, B-2, B-3 compared to sum of G-1, G-2, G-3 and to R-1. It should be noted that the photocurrent from photodetectors B-1 and B-3 can be larger than that from photodetector B-2 due to the fact that the spectral intensity is integrated over a larger wavelength range.

When the ratio of the spectral intensities of B-2 to B-1, B-2 to B-3, G-2 to G-1 or G-2 to G-3 is high, for example, on the order of 3:1 or 5:1, the digital controller 22 then determines if there is any 120 Hz component from B-2 at 435.8 nm by looking at the output of the transimpedance amplifier 16 utilizing a high pass filter, or a notch filter 26 tuned to 120 Hz. It is well known in the art that fluorescent light has a characteristic 120 Hz intensity profile. Thus, if the 120 Hz component is present, the scene illuminant is fluorescent light. If the ratio of the summation of the blue signals (B-1, B-2, B-3) to the red signal (R-1) is over 2:1 and there is no AC component in blue or green, then the scene illuminant is tungsten. If the ratio of the summation of the blue signals (B-1, B-2, B-3) to the summation of the green signals (G-1, G-2, G-3), or the summation of the green signals (G-1, G-2, G-3) to the red signal level (R-1) is within 25%, then the scene illuminant is daylight.

Once the scene illuminant is determined to be fluorescent light, tungsten, or daylight, the scene illuminant information is stored in the controller memory 24 in the image capture device 11. The digital controller 22 then sends a code to a magnetic write head 28 in the image capture device 11 to record the presence of fluorescent light, tungsten, or daylight on photographic film 30 (or with the digital image data if the image capture device is a digital camera). If the image capture device 11 is a camera using photographic film 30, the information can be stored on a magnetic coating on each frame of the photographic film 30 or can be recorded optically outside the image area of the photographic film 30 by a light emitting diode (LED). Likewise, if the image capture device 11 is a digital camera, the information is stored with the digital image data for each picture. A photofinisher can then read the information stored on each photographic film frame or with the digital image data to properly compensate for the presence of fluorescent light, tungsten, or daylight during printing.

To determine the scene intensity, and thus, the required exposure time for a given photograph or digital image, the digital controller 22 sums the spectral intensities from all spectral regions (B-1, B-2, B-3, G-1, G-2, G-3, and R-1). If the intensity is below a predetermined level, a camera flash (not shown) will be activated to provide artificial illumination. If the intensity is above the predetermined level, the camera flash is not activated, and the digital controller 22 uses an algorithm to determine the appropriate exposure settings for the image capture device 11. The algorithms for determining exposure settings are well known in the art, and can be, for example, an algorithm to calculate the exposure time for a given aperture setting based on film speed and total scene intensity. Alternatively, a combination of aperture setting and exposure time can be determined by the digital controller 22. The digital controller 22 then sends the appropriate aperture setting and shutter exposure time information to an aperture drive (AD) 32 and shutter drive (SD) 34, respectively, of the image capture device 11. It will be understood by those skilled in the art that the digital controller 22 can send the information as analog control voltage signals or as digital data signals. The aperture drive 32 and shutter drive 34 control the size of the aperture and the duration of the shutter in its open position, respectively, to adjust the exposure of the photographic film or digital image in a manner well known in the art.

It is well known in the art that other types of digital cameras use interline transfer CCD sensors which integrate the incident illumination over an exposure time. These sensors vary the exposure duration electronically, and therefore, do not utilize a shutter exposure time or an aperture setting. For digital cameras using interline transfer CCD sensors, the digital controller 22 can determine an appropriate exposure integration time from the summation of the spectral intensities from all spectral regions. Interline transfer CCD sensors are described in more detail in "Solid State Imaging With Charge-Coupled Devices" by A. Theuwissen, on page 117.

The scene intensity measuring and illumination source detection apparatus 10 in accordance with the present invention has been described in conjunction with digital processing. However, it would be understood by persons skilled in the art that the processing could also be accomplished by analog processing, for example, by use of an analog comparator or by taking the difference of two signals produced by a logarithmic amplifier.

The invention has been described in detail with particular reference to a preferred embodiment thereof. However, it will be appreciated that variations and modifications can be effected by a person of ordinary skill in the art without departing from the spirit and scope of the invention.

Parts List 10 apparatus
11 image capture device
12 diffractive optical element
14 photodetector array
16 transimpedance amplifier
18 A to D converter
20 trigger switch
22 digital controller
24 controller memory
26 notch filter
28 magnetic write head
30 photographic film
32 aperture drive
34 shutter drive

What is claimed is:

1. Scene intensity measuring and illumination source detection apparatus for determining scene illuminant and appropriate exposure settings for an image capture device, comprising:

(a) a diffractive optical element including an off-axis segment for dispersing incident scene illumination into its spectral components and for focusing the incident scene illumination;

(b) sensing means responsive to the spectral components of the incident scene illumination for producing detection signals corresponding to the spectral intensities of such spectral components;

(c) means coupled to the sensing means for producing digitized detection signals; and (d) means responsive to the digitized detection signals for determining the scene illuminant and the appropriate exposure settings for the image capture device.

2. The apparatus of claim 1 wherein the detection signals correspond to the spectral intensities of the spectral components of the incident scene illumination in ranges of 400–430 nm, 435.8 nm, 440–500 nm, 500–540 nm, 546.1 nm, 550–600 nm, and 600–700 nm, respectively.

3. The apparatus of claim 2 wherein the sensing means includes seven photodiodes, each photodiode being responsive to one of the ranges of spectral components so that the photodiodes produce the detection signals.

4. The apparatus of claim 3 wherein the digitized detection signal producing means includes memory means for storing the scene illuminant information and means for storing such information in the image capture device.

5. The apparatus of claim 4 wherein the image capture device is a camera using photographic film.

6. The apparatus of claim 5 wherein the information is stored on a magnetic coating on the photographic film.

7. The apparatus of claim 5 wherein the information is stored optically outside the image area of the photographic film.

8. The apparatus of claim 5 wherein the camera includes means defining a variable aperture and a shutter movable between open and closed positions, and means responsive to the appropriate exposure settings for adjusting the size of the aperture and the duration of the shutter in its open position.

9. The apparatus of claim 4 wherein the image capture device is a digital camera and wherein the information is stored with the digital image data.

10. The apparatus of claim 9 wherein the digital camera includes means defining a variable aperture and a shutter movable between open and closed positions, and means responsive to the appropriate exposure settings for adjusting the size of the aperture and the duration of the shutter in its open position.

11. The apparatus of claim 9 wherein the digital camera includes an interline transfer CCD sensor which integrates the incident illumination over an exposure time, and means responsive to the appropriate exposure settings for adjusting the exposure integration time of the interline transfer CCD sensor.

12. Scene intensity measuring and illumination source detection apparatus for determining appropriate exposure settings for an image capture device and for determining whether the illumination source is fluorescent light, tungsten, or daylight, comprising:

(a) a diffractive optical element including an off-axis segment for dispersing incident scene illumination into its spectral components and for focusing the incident scene illumination;

(b) sensing means responsive to the spectral components of the incident scene illumination for producing detection signals corresponding to the spectral intensities of such spectral components in ranges of 400–430 nm, 435.8 nm, 440–500 nm, 500–540 nm, 546.1 nm, 550–600 nm, and 600–700 nm;

(c) means coupled to the sensing means for producing digitized detection signals;

(d) means responsive to the digitized detection signals for determining the appropriate exposure settings for the image capture device;

(e) means responsive to the digitized detection signals corresponding to the 435.8 nm and 546.1 nm spectral components for indicating that the illumination source is fluorescent light;

(f) means responsive to the digitized detection signals corresponding to the spectral components in the 400–430 nm, 435.8 nm, 440–500 nm, and 600–700 nm ranges for indicating that the illumination source is tungsten; and (g) means responsive to the digitized detection signals corresponding to the spectral components in the 400–430 nm, 435.8 nm, 440–500 nm, and 600–700 nm ranges for indicating that the illumination source is daylight.

13. The apparatus of claim 12 wherein the diffractive optical element focuses the spectral components of the incident light onto the sensing means.

14. The apparatus of claim 13 wherein the sensing means includes seven photodiodes, each photodiode being responsive to one of the ranges of spectral components so that the photodiodes produce the detection signals.

15. The apparatus of claim 14 wherein the digitized detection signal producing means includes memory means for storing the information corresponding to whether the illumination source is fluorescent light, tungsten, or daylight, and means for storing such information in the image capture device.

16. The apparatus of claim 15 wherein the image capture device is a camera using photographic film.

17. The apparatus of claim 16 wherein the information is stored on a magnetic coating on the photographic film.

18. The apparatus of claim 16 wherein the information is stored optically outside the image area of the photographic film.

19. The apparatus of claim 16 wherein the camera includes means defining a variable aperture and a shutter movable between open and closed positions, and means responsive to the appropriate exposure settings for adjusting the size of the aperture and the duration of the shutter in its open position.

20. The apparatus of claim 15 wherein the image capture device is a digital camera and wherein the information is stored with the digital image data.

21. The apparatus of claim 20 wherein the digital camera includes means defining a variable aperture and a shutter movable between open and closed positions, and means responsive to the appropriate exposure settings for adjusting the size of the aperture and the duration of the shutter in its open position.

22. The apparatus of claim 20 wherein the digital camera includes an interline transfer CCD sensor which integrates the incident illumination over an exposure time, and means responsive to the appropriate exposure settings for adjusting the exposure integration time of the interline transfer CCD sensor.

* * * * *